United States Patent [19]

Engstrom et al.

[11] Patent Number: 4,672,918
[45] Date of Patent: Jun. 16, 1987

[54] CIRCULATING FLUIDIZED BED REACTOR TEMPERATURE CONTROL

[75] Inventors: Folke Engstrom, Karhula, Finland; Juha Sarkki, San Diego, Calif.

[73] Assignee: A. Ahlstrom Corporation, Karhula, Finland

[21] Appl. No.: 734,716

[22] Filed: May 16, 1985

[30] Foreign Application Priority Data

May 25, 1984 [FI] Finland ................................. 842098
Apr. 1, 1985 [FI] Finland ................................. 851296

[51] Int. Cl.⁴ .............................................. F22B 1/00
[52] U.S. Cl. .................................... 122/4 D; 110/245; 165/104.16
[58] Field of Search ...................... 122/4 D; 110/245; 165/104.16; 431/7

[56] References Cited

U.S. PATENT DOCUMENTS

| | | |
|---|---|---|
| 3,970,011 | 7/1976 | Virr et al. |
| 4,103,646 | 8/1978 | Yerushalmi et al. ............... 122/4 D |
| 4,111,158 | 9/1978 | Reh et al. |
| 4,165,717 | 8/1979 | Reh et al. |
| 4,240,377 | 12/1980 | Johnson |
| 4,419,965 | 12/1983 | Garcia-Mallol et al. .......... 122/4 D |
| 4,454,838 | 6/1984 | Strohmeyer, Jr. ................. 122/4 D |
| 4,473,032 | 9/1984 | Maintok ............................ 122/4 D |

FOREIGN PATENT DOCUMENTS

0093063 11/1983 European Pat. Off. .
2030689 7/1980 United Kingdom .

Primary Examiner—Edward G. Favors
Attorney, Agent, or Firm—Nixon & Vanderhye

[57] ABSTRACT

A simple yet effective method and apparatus control the temperature within a fluidized bed reactor within a desired range (e.g. about 800°–950° C.). Particulate solids in the off-gases from the combustion chamber of the reactor are separated out, and pass through one or more of a plurality of return conduits back to the combustion chamber. The temperature of the returning solids is controlled by positively cooling them, utilizing heat exchangers, within one or more of the conduits, and by controlling which of the conduits the solids flow through. Valves at the top of the conduits can control the flow of solids into the conduits. Alternatively U-shaped passageways at the bottom of the conduits between them and the combustion chamber can have fluidizing air injected therein, the injected air controlling the flow of solids out of the conduits into the combustion chamber.

15 Claims, 8 Drawing Figures

CIRCULATING FLUIDIZED BED REACTOR TEMPERATURE CONTROL

BACKGROUND AND SUMMARY OF THE INVENTION

The invention relates to a method and apparatus for controlling the combustion temperature in a fluidized bed reactor. In fluidized bed reactors, it is necessary to control the temperature within the combustion chamber so that it is within a desired range in order to maximize the efficiency of the combustion process, and minimize pollutants. Typically, the temperature should be controlled so that it is within the range of about 600°–1100° C. For example, in order to provide an optimal sulfur absorption when burning coal, it is desirable to maintain the combustion chamber within a temperature range of 800°–950° C., and preferably within the range of just below to just above 880° C.

There have been a number of proposals for controlling the combustion chamber temperature of a fluidized bed reactor in the prior art. Typical prior art proposals include controlling the amount of excess air; recirculating flue gases back to the reactor; changing the suspension density in the combustion chamber; dividing the bed into separate functional compartments; and positively cooling a part of the bed material with a separate heat exchanger. Each of these prior art proposals have had disadvantages associated therewith, often either decreasing efficiency, or significantly increasing capital expenditures, or both. According to the present invention a method and apparatus are provided which effectively control the combustion chamber temperature, but do so in such a manner that capital investment is not significantly increased, and combustion efficiency is not adversely impacted.

According to one aspect of the present invention, a method of controlling the temperature in the combustion chamber of a fluidized bed reactor which emits off-gases having particulate solids therein, to keep the temperature within a desired temperature range, is provided. The method comprises the continuous practice of the following steps: (a) Separating the solids from the off-gases. (b) Controlling the temperature of the separated solids. (c) Returning the temperature controlled solids from step (b) to the combustion chamber. And, (d) practicing steps (b) and (c) so that the mass and temperature of the returned solids contribute to the heat content within the combustion chamber in such a way as to maintain it within the desired temperature range. The temperature range is about 600°–1100° C., preferably about 800°–950° C. Steps (b) and (c) are preferably practiced by providing a plurality of return conduits, positively cooling solids passing through at least one of the return conduits, and controlling which conduits the solids flow through.

According to another aspect of the present invention, a fluidized bed reactor is provided in which the combustion chamber temperature may be effectively controlled. The fluidized bed reactor comprises the following elements: A combustion chamber having a lower portion into which the fuel is introduced, and an upper portion into which off-gases with entrained solids pass. Means for effecting separation of solids from the off-gases in the upper part of the combustion chamber. A plurality of return conduits extending between the separating means and the lower part of the combustion chamber. At least one of the return conduits having heat transfer surface means associated therewith for positively cooling solids in contact therewith passing through the conduit. And, means for controlling which of the conduits the solids flow through to return to the lower part of the combustion chamber. According to one embodiment of the invention, no positive cooling means is provided in at least one of the conduits, and the controlling means comprises either diverting valve means at the top of the conduits, or a U-shaped passageway between the conduit(s) having cooling means associated therewith and the lower part of the combustion chamber with means for injecting fluidizing air into the U-shaped passageway. According to another embodiment of the invention, all of the conduits have positive cooling means associated therewith. The conduit flow control means may comprise valve means disposed in the top of each of the conduits; or alternatively a passageway with a bend (e.g. U-shaped or L-shaped) disposed between the bottoms of each of the conduits and the lower part of the combustion chamber, and means for introducing fluidizing air into selected ones of the U-shaped passageways.

It is the primary object of the present invention to provide a method and apparatus for the efficient and effective control of the temperature within the combustion chamber of a fluidized bed reactor. This and other objects of the invention will become clear from an inspection of the detailed description of the invention, and from the appended claims.

DETAILED DESCRIPTION

Figures 1, 2:
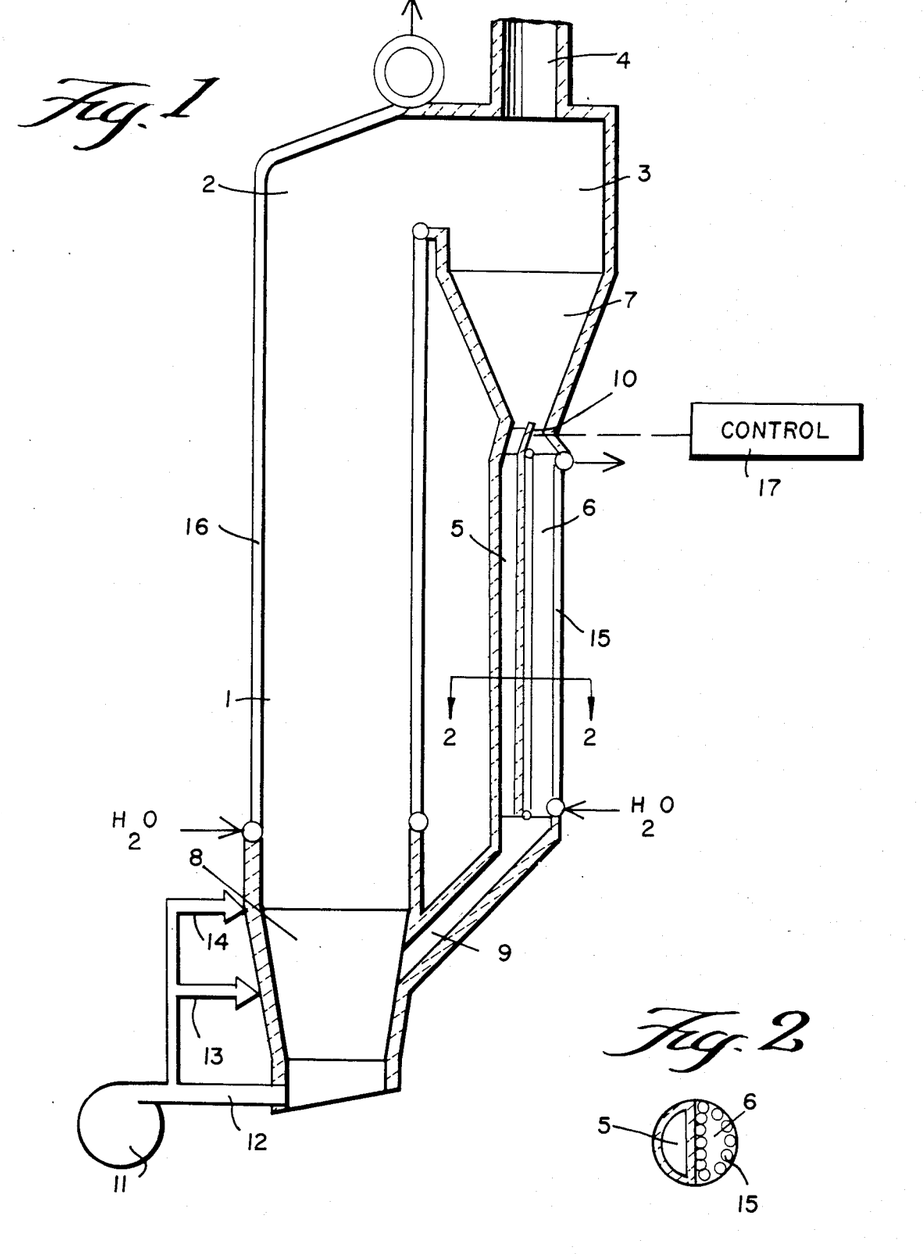
FIGS. 1, 3, 5, and 7 are side schematic views of four different embodiments of fluidized bed reactors according to the present invention.
FIG. 2 is a detail cross-sectional view taken along lines A—A of FIG. 1.

FIG. 1 schematically illustrates one embodiment of a fluidized bed reactor according to the present invention, having a combustion chamber 1 including an upper part 2 into which off-gases flow, and a lower part 8 into which the fuel is introduced. Operatively connected to the upper part 2 is a means for separating particulate solids in the off-gases from the off-gases, such a means comprising a cyclone separator 3 in the embodiment illustrated in FIG. 1. Gases separated by the separator 3 pass up the gas discharge pipe 4, while separated solids are discharged through the bottom 7 of the separator 3.

As is conventional in fluidized bed reactors, combustion and fluidizing air is supplied to the lower part of the combustion chamber 8 from blower 11 through pipes 12, 13, and 14. Further, heat transfer surfaces 16, through which water is circulated in a conventional manner, are provided lining the combustion chamber 1 above the lower part 8 thereof, to cool the combustion products flowing upwardly in the combustion chamber 1 from the lower part 8 thereof, and recover heat therefrom. Also as is conventional, means are provided for recirculating solids separated by the cyclone separator 3 back to the lower part 8 of the combustion chamber. However the particular solids recirculating means are totally unconventional and novel.

It is primarily by controlling the temperature of the recirculated solids that the temperature in the combustion chamber 1 is controlled according to the present invention. Control of the temperature of the combustion products is primarily effected by providing a plurality of return conduits. In the embodiment illustrated in FIG. 1, two different return conduits 5, 6, are provided, connected at the tops thereof to the lower part 7 of the cyclone separator 3, and connected at the bottoms thereof to the pipe or chute 9 which feeds directly to the lower part 8 of the combustion chamber.

In order to provide effective temperature control according to the present invention, at least one of the return conduits has heat transfer surface means associated therewith for positively cooling solids passing through that conduit, and means are provided for controlling which conduit or conduits the solids flow through to return to the combustion chamber. In the embodiment illustrated in FIGS. 1 and 2, the return conduit 5 is lined with heat insulating material, and does not effect significant positive cooling of the solids passing therethrough. However the return conduit 6 is lined with heat transfer surfaces of a heat exchanger 15. Water is circulated through the heat exchanger 15 so that positive cooling of the solids passing through the return conduit 6 is effected.

In the FIGS. 1 and 2 embodiment, the means for controlling which conduit(s) the solids flow through comprises a diverting valve 10 pivotally mounted to the top of the insulating inner wall of the conduit 5, and movable by a suitable conventional powered control 17 to any position between a first extreme position wherein no flow of particles into the conduit 5 is allowed (and thus all the particles flow through the conduit 6), to a second extreme position in which no flow of solids into the conduit 6 is allowed (but rather all the particles flow through the conduit 5).

Thus it will be seen that the conduits 5 and 6, the heat transfer means 15 associated with the conduit 6, and the diverter valve 10 and control 17 therefor, control the temperature of the solids returned to the lower part of the combustion chamber 8, the control being effected so that the volume and temperature of the returned solids contribute to the heat content within the combustion chamber lower part 8 so as to maintain it within a desired temperature range. This desired temperature range preferably is between about 800°-950° C., which provides for effective and efficient combustion of the fuel, yet achieves optimal sulfur absorption and other desirable benefits. In this way the temperature of combustion is independent of variations in the caloric value of the fuel added to the combustion chamber. Of course suitable temperature sensors may be provided in the combustion chamber which are operatively connected to the control 17 to determine the relative flows of solids through the conduits 5 and 6, and thus the temperature of the returned solids. For instance if the temperature sensor senses that because of a lower caloric value of fuel added to the combustion chamber the temperature is dropping below a desired range, the control 17 will be actuated to move the diverter valve 10 so that it diverts more of the solids from the separator 3 to the conduit 5, thereby raising the temperature of the returned solids and thus ultimately the temperature in the combustion chamber.

Figures 3, 4:
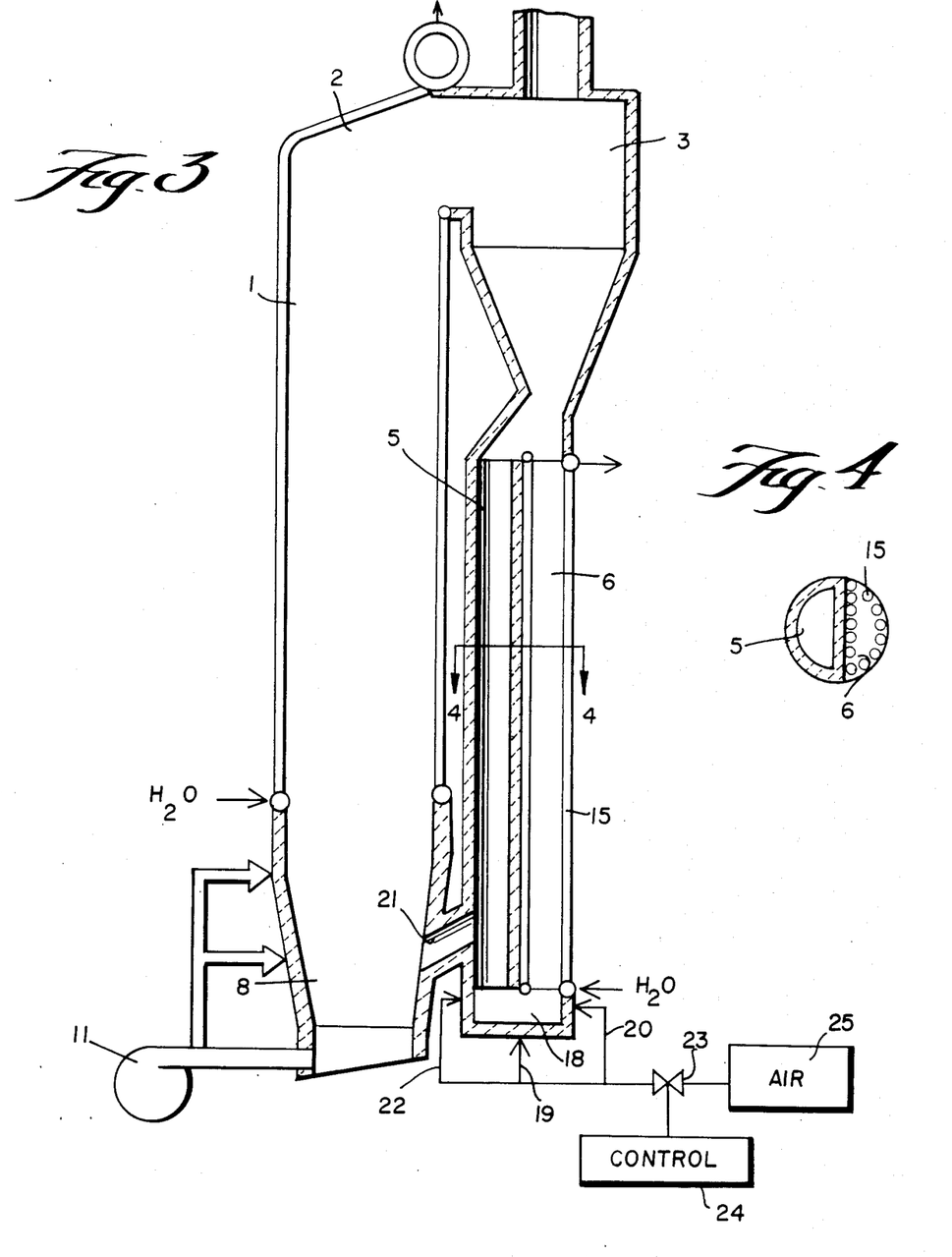
FIG. 4 is a detail cross-sectional view taken along lines B—B of FIG. 3.

In the FIGS. 3 and 4 embodiment of the invention, component parts identical to those in the FIGS. 1 and 2 embodiment are shown by the same reference numerals.

The major difference between the embodiment of FIGS. 3 and 4, and the embodiment in FIGS. 1 and 2, is the particular mechanism for controlling which conduit(s) the solids flow through. In this embodiment, there is no diverter provided at the top of the conduits 5 and 6, and only the conduit 5 is directly connected, through chute 21, to the lower part 8 of the combustion chamber 1. The conduit 6 is connected through a passageway to chute 21. The passageway 18 has a bend in it—that is it is either generally L-shaped, or generally U-shaped, as shown in the drawing. Disposed in operative association with the U-shaped passageway 18 in various parts thereof are pipes 19, 20, 22 for injecting fluidizing air into the passageway 18. The amount of fluidizing air injected by the pipes 18, 19, 22 is controlled by controlling the valve 23 with the controller 24, the valve 23 being connected up to a source of compressed air 25. Of course valves can be provided in each of the conduits 19, 20, 22 if desired to control the area within the passageway 18 in which the fluidizing air is injected.

In the FIGS. 3 and 4 embodiment, some solids will always be passing through the conduit 5 to the chute 21, but the conduit 6, if the valve 23 is closed, will fill up with solids, and no solids will be able to pass into the chute 21 since a "lock" will be provided at the passageway 18. However by controlling the position of the valve 23 with the controller 24, various amounts of fluidizing air can be injected into the passageway 18, the injection of fluidizing air causing flow of solids through the conduit 6 and into the chute 21 into the lower part 8 of the combustion chamber. Thus, in the FIGS. 3 and 4 embodiment, in response to sensing of the temperature in the combustion chamber the controller 24 will position the valve 23 in any desired position between completely open and completely closed.

Figures 5, 6:
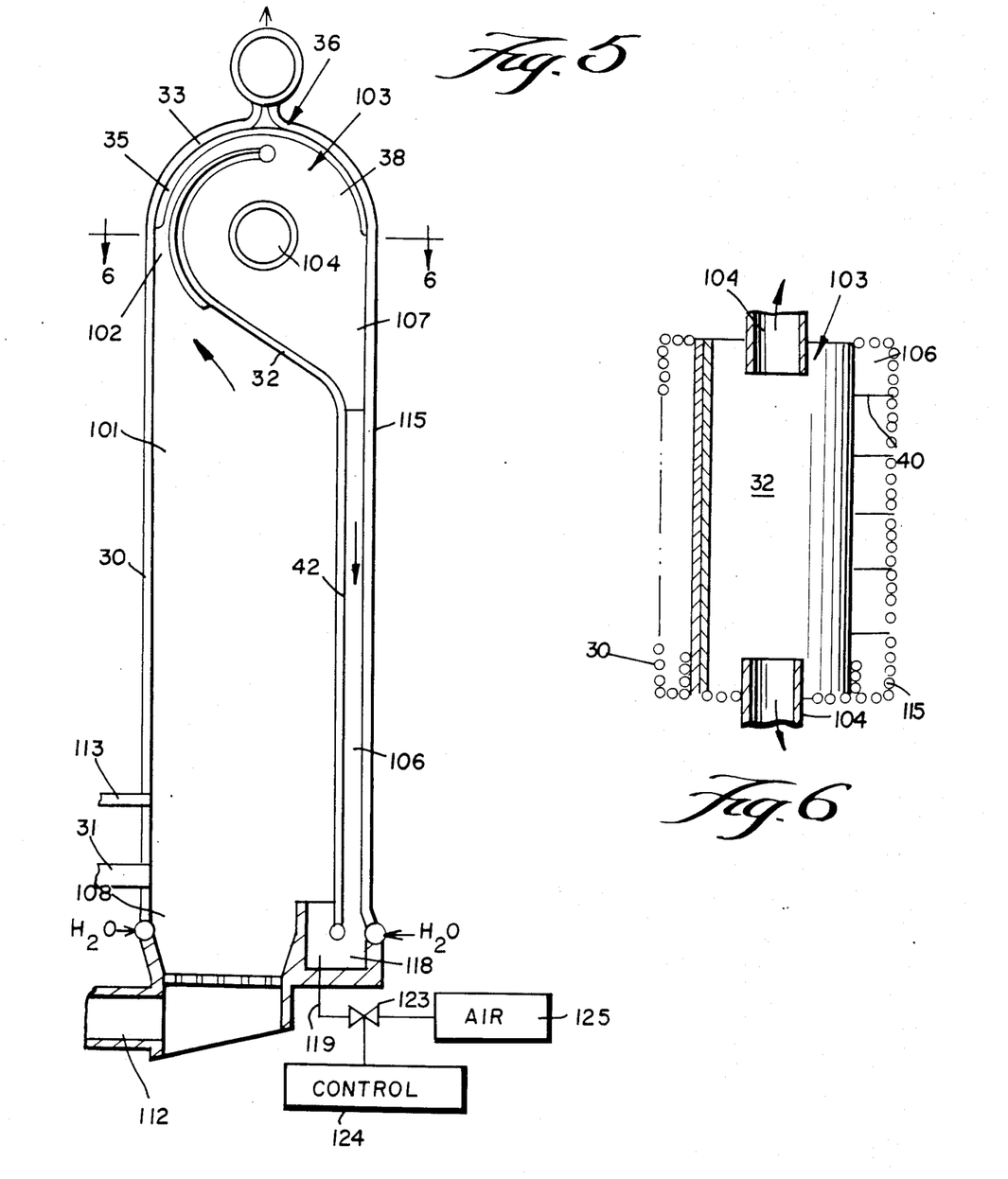
FIG. 6 is a schematic cross-sectional view taken along lines A—A of FIG. 5.

The FIGS. 5 and 6 embodiment is similar to the FIGS. 3 and 4 embodiment of the invention, except for the particular shape of the reactor components, and the number of return conduits provided and the cooling effect provided therein. In the FIGS. 5 and 6 embodiment, components similar to those in the FIGS. 3 and 4 embodiment will be designated by the same reference numeral only preceded by a "1" (or a "10" in the case of single digit reference numerals from the FIGS. 3 and 4 embodiment).

In the fluidized bed reactor of FIGS. 5 and 6, the combustion chamber 101 includes the lower part 108 and the upper part 102. All the walls of the combustion chamber in this embodiment are formed by heat transfer surfaces (i.e. form a boiler), which are connected to the circulating system of the boiler in a conventional manner, the heat transfer surfaces being denoted generally by the reference numeral 30. A fuel inlet pipe 31 is disposed in the lower part of the combustion chamber 8, as also are inlet pipes 112 and 113 for injecting primary and secondary gas for fluidizing and supporting combustion.

At the upper part 102 of the combustion chamber 101, a back wall 32 is curved so that it forms more or less a ceiling for the combustion chamber 101 and after that runs parallel to the cylindrical part 33 of the front wall of the combustion chamber 101, that they form inner and outer walls of a gas inlet conduit 35 to the separator 103. The reactor thus has an upper portion which is generally in the shape of a cylinder segment, as denoted by reference numeral 36.

In the FIGS. 5 and 6 embodiment, the means for separating the solids from the combustion off-gases comprises the gas inlet conduit 35 and its particular cooperation with the turbulence chamber 38. The gas from which solids has been removed in the turbulence chamber 38 passes through discharge openings 104 extending outwardly from the sides of the turbulence chamber 38, while the separated solids drop into the lower portion 107 of the separator 103.

In the embodiment illustrated in FIGS. 5 and 6, the plurality of conduits 106 extending from the separator 103 to the lower part of the combustion chamber 108 each have heat transfer surface means (heat exchangers) 115 associated therewith. In this embodiment six return conduits 106 are illustrated, although any number from two on up may be provided. The separating walls 40 are provided between each of the conduits 106, and the heat transfer means 115 may, or may not, be associated with the partition walls 40. Note that a part of the heat transfer means 115 actually comprises the inner wall 42 of the combustion chamber 101, which of course also has water circulating therethrough.

In the embodiment of FIGS. 5 and 6, each of the conduits 106 is connected at the bottom thereof through a U-shaped passageway 118 to the lower part 108 of the combustion chamber. Each of the conduits 106 fills with separated solids, and the means for controlling which conduits the solids actually flow through to the lower part 108 of the combustion chamber comprises a plurality of fluidizing air injection pipes 119, preferably one associated with each conduit 106. Each of the pipes 119 is connected through a valve 123 to a source of compressed air 125, and a controller 124 is provided for controlling all of the valves 123. The temperature of the returned solids is thus controlled by controlling the number of valves 123 which are open. When all of the valves 123 are open there is a maximum cooling effect by the heat exchangers 115 on the recirculating solids, and thus the recirculating solids will have a maximum lowering effect on the temperature within the combustion chamber 101. When only one of the valves 123 is open, then there will be the least cooling effect on the solids being recirculated, which will tend to maintain the combustion chamber 101 at a higher temperature.

Figures 7, 8:
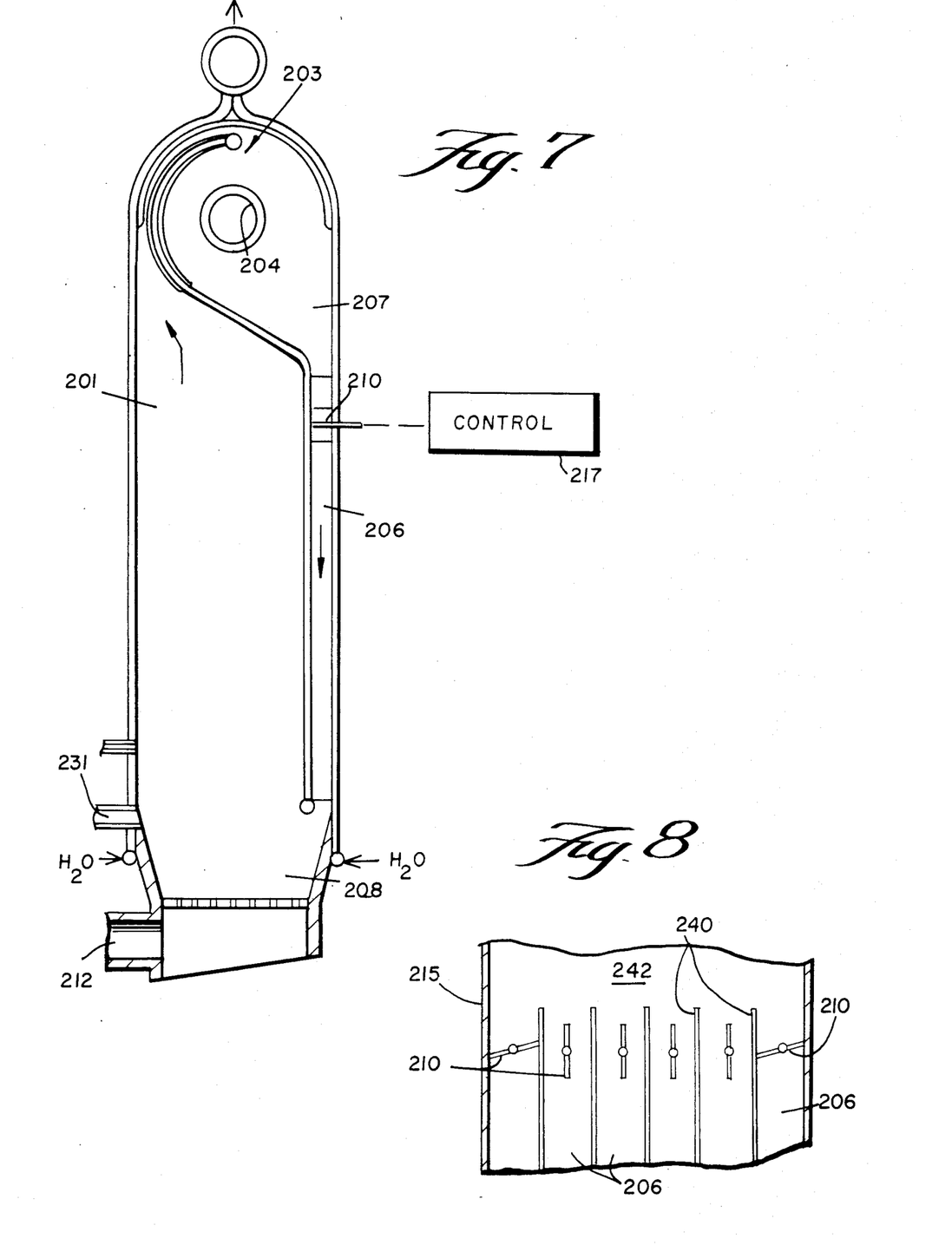
FIG. 8 is a partial side view of the reactor of FIG. 7 between arrows B—B of FIG. 7, with portions of the side wall of the reactor removed for clarity of illustration.

In the embodiment illustrated in FIGS. 7 and 8, components comparable to those in the FIGS. 5 and 6 embodiment are illustrated by the same last two digit reference numeral, only are preceded by a "2".

The major distinction between the FIGS. 7 and 8 embodiment and the FIGS. 5 and 6 embodiment is in the particular manner for controlling which conduits the returned solids through. In this embodiment each of the return conduits 206 is directly connected to the lower part 208 of the combustion chamber, and disposed adjacent the top of each of the conduits 206 is a valve member 210. Each of the valve members 210 is connected to a controller 217. The valves 210 are rotated between closed positions (left and right handmost valves in FIG. 8) and open positions (intermediate four valves in FIG. 8) to either prevent solids from entering the conduits 206, or allow free flow of solids through the conduits 206. Again, by controlling the number of conduits 206 through which the solids flow, the temperature of the solids entering the combustion chamber may be controlled. Note also that the maximum cooling capability of the conduits 206 may vary somewhat if partitions 240 therebetween do not have heat exchangers associated therewith. In this case, the two endmost conduits will have three walls defined by heat exchanger surfaces, while the innermost four conduits will only have two walls defined by such surfaces, and thus there will be a differential in this cooling capacity therebetween. This may also be taken advantage and account of in determining the number and particular conduits 206 through which the flow of returning solids will be provided.

In the embodiments of FIGS. 1, 2, 7, and 8, the mass of the solids returned to the lower part 8 will not change in response to the number of closed return conduits, only the temperature. However, in the FIGS. 3, 4, 5, and 6 embodiments part of the particulate solids will be stored in the closed return conduits, which will decrease the amount of material being recirculated. This affects the solids density in the combustion chamber and consequently the heat transfer to the cooling surface within the combustion chamber. This additional effect of the control of the solids flow through selected return conduits may be used to increase the flexibility of the system.

It will thus be seen that utilizing the apparatus heretofore described, a method of controlling the temperature in the combustion chamber of a fluidized bed reactor is provided, to keep the temperature within a desired temperature range. The method comprises the steps of continuously: Separating the solids from the gases (in separators 3, 103, 203); Controlling the temperature of the separated solids (by passing them in contact with the heat exchangers 15, 115, 215, for effecting cooling thereof); Returning the temperature controlled solids to the combustion chamber (through chutes 9 or 21, or the bottoms of conduits 106, 206); and practicing the temperature controlling and solids returning steps (by controlling the controllers 17, 24, 124, 217) so that the temperature (and mass) of the returned solids contribute to the heat content within the combustion chamber lower part (being either cooled greater or lesser amounts depending upon which conduits 5, 6, 106, 206 the solids pass through) to maintain the combustion chamber within the desired temperature range (e.g. about 600°–1100° C., preferably about 800°–950° C., and typically just above or below 880° C.

EXAMPLES, COMPARISON TO PRIOR ART

The apparatus and method for controlling the combustion temperature in the fluidized bed reactor according to the present invention provide both effective and efficient control, without significant increase in capital costs. This should be compared to other known methods for controlling the combustion temperature.

Using a known previously known method the combustion temperature of the reactor can be adjusted to about 880° C. by means of about 80% air excess and the efficiency decreases about 3.3%. Further, the increased power demand which is caused by blowing high pressure air into the reactor causes a decrease in efficiency of about 0.7%; in other words the total decrease in efficiency of the reactor is about 4%.

Another known method to adjust the combustion temperature to 880° C. is to recirculate flue gases to the combustion chamber. Recirculating of the flue gases decreases the reactor efficiency about 0.6% because the blower for recirculating flue gases increases the power demand. In addition to this, extra equipment, such as a flue gas blower, flue gas pipes, instrumentation, etc. is needed, resulting in increased capital costs.

Utilizing the apparatus according to the embodiment of the invention illustrated in FIGS. 1 and 2, the following examples should be considered, and compared to the prior art processes described above:

EXAMPLE 1

The main fuels in the fluidized bed reactor according to FIG. 1 were wood waste and coal, the moisture contents and caloric values of which were as follows:

| Fuel | Wood Waste | Coal |
| --- | --- | --- |
| moisture content % | 50 | 10 |
| caloric value kJ/kg | 10230 | 27150 |

The combustion took place at a temperature of 880° C. and with about 23% excess air. Reactor walls functioned as heat transfer surfaces, comprising about 100 m² of the reactor.

While burning wood waste the amount of heat transferred by the heat transfer surfaces was 12 MW when converted into output. The circulating solid particles were separated in the masonry cyclone 3 and the separated solids were returned to the lower part 8 of the combustion chamber, with a temperature of about 880° C., through return pipe 5. The total net output of the reactor, including the convection part (not shown) after the reactor, was 29 $MW_t$.

While burning coal in the reactor with the same total net output of 29 $MW_t$, with the same air excess of about 23% and the same gas temperature of about 880° C. after the cyclone 3, the amount of heat transferred by the heat transfer surfaces of the reactor was 13.5 MW when converted into output due to a better heat transfer when burning coal. The separated material was returned to the reactor through the cooled conduit 6 which was equipped with about 30 m² heat transfer surfaces when about 4 $MW_t$ (i.e. about 14% of the total net output of 29 $MW_t$ of the reactor) was transferred to the cooling surfaces of return pipes 15. Despite the higher caloric value of the fuel (coal vs. wood) it was possible to control the reactor temperature, the total net output remaining 29 $MW_t$, with the described method, so that it was the same (with the same air excess) as when burning wood waste.

EXAMPLE 2

A circulating bed reactor similar to the one in the previous example was used, modified so that the return pipes 15 were provided with about 70 m² of heat exchange surface. While burning coal the amount of transferred heat with these surfaces was 9.4 MW when converted into output. The amount of heat transferred by the heat transfer surfaces of the reactor was 15 MW when converted into output, and the output received from the convection components (part behind the reactor) was 16.6 MW, increasing the total net output of the reactor from 29 $MW_t$ to 41 $MW_t$ (i.e. 40%). Thus coal burning efficiency increased, a significant advantage.

EXAMPLE 3

Coal was burned in a steam boiler according to the FIG. 5 embodiment, the effective caloric value of which was 28 MJ/kg at a rated output of 65MW and a temperature of 880° C. 40 MW of heat was recuperated with 185 m² of heat exchange surfaces of the combustion chamber 101 and with 120 m² of heat exchange surfaces of the six parallel return conduits 106. At a steam output of about 20 MW, in other words at a 30% load, the same combustion temperature was achieved as at the rated output by closing three of the return conduits 106.

EXAMPLE 4

In the same boiler as in Example 3 peat was burned, the effective caloric value of which was 8 MJ/kg, and the rated steam output of which was 65 MW. In order to adjust the combustion temperature to about 870° C. the cooling effect of return conduits 106 was diminished by closing four of the conduits 106. All solids were directed through the second and fifth return conduits to the reactor. In this way 30 MW of heat was recuperated in the reactor and the return conduits.

Of course many other variations may be provided within the scope of the present invention. For instance in the FIGS. 1 through 4 embodiments, the heat recovered by the heat exchangers 115 may also be utilized in a manner so as to effectively recover it. Further, the amount of positive cooling effect provided in the return conduits may be varied by varying the flow rate of cooling liquid, or by changing the type of heat exchange liquid. Many other modifications are possible, thus it is intended that the invention be accorded the broadest interpretation of the appended claims so as to encompass all equivalent structures and methods.

What is claimed is:

1. A method of controlling the temperature in the combustion chamber of a fluidized bed reactor which emits off-gases having particulate solids therein, to keep the temperature within a desired temperature range, comprising the steps of continuously:
   (a) separating the solids from the off-gases;
   (b) controlling the temperature of the separated solids;
   (c) returning the temperature controlled solids from step (b) to the combustion chamber; and
   (d) practicing steps (b) and (c): so that the temperature of the returned solids contribute to the heat content within the combustion chamber in such a way as to maintain it within said desired temperature range; by providing a plurality of solids return conduits; positively cooling the solids in at least one of the plurality of return conduits; controlling the flow of solids through selected return conduits back to the combustion chamber; so that the mass of the returned solids is also controlled, and by cooling solids passing through each of the return conduits, and selectively blocking off the flow of solids through one or more of the conduits to control the temperature of the solids being discharged from the conduits through which the solids flow.

2. A method as recited in claim 1 wherein said temperature range is between about 800°-950° C.

3. A method as recited in claim 2 wherein said temperature range is between just below 880° C. and just above 880° C.

4. A method as recited in claim 2 wherein steps (b) and (c) are practiced by providing a plurality of solids return conduits; positively cooling the solids in at least one of the plurality of return conduits; and controlling the flow of solids through selected return conduits back to the combustion chamber.

5. Apparatus for controlling the temperature in a combustion chamber of a fluidized bed reactor which emits off-gases having particulate solids therein, to keep the temperature within a desired temperature range, comprising:
   (a) means for separating the solids from the off-gases;
   (b) means for controlling the temperature of the separated solids;
   (c) means for returning the temperature controlled solids to the combustion chamber; and
   (d) means for controlling the means (b) and (c) so that the temperature, or temperature and mass, of the returned solids contribute to the heat content within the combustion chamber so as to maintain the temperature within the desired temperature range;
   said means (b) and (c) and (d) comprising a plurality of return conduits from said means (a) to said combustion chamber, each of said return conduit means having heat exchanger means therein for positively cooling solids passing through said conduit; and means for controlling the flow of solids through said conduits;

6. Apparatus as recited in recited in claim 5 wherein said controlling means comprise means for controlling the entry of solid particles into any one of said conduits.

7. Apparatus as recited in claim 5 further comprising a passageway extending between at least selected ones of said conduits and said combustion chamber, and wherein said controlling means comprises means for supplying fluidizing air to said passageway to control the flow of solids through said passageway.

8. A fluidized bed reactor comprising:
   a combustion chamber having a lower portion into which fuel is introduced, and an upper portion into which off-gases with entrained solids pass;
   means for effecting separation of solids from the off-gases in said upper part of said combustion chamber;
   a plurality of return conduits extending between said separating means and said lower part of said combustion chamber;
   at least one of said return conduits having heat transfer surface means associated therewith for positively cooling solids in contact therewith passing through said conduit; and
   means for controlling which of said conduits the solids flow through to return to said lower part of said combustion chamber, wherein said at least one conduit having heat transfer surface means associated therewith is connected to said lower part of said combustion chamber by a passageway with a bend therein, said bend configured to normally prevent solids from flowing directly into the combustion chamber from said at least one conduit having heat transfer surface means, and wherein said means for controlling which of said return conduits the solids flow through comprises means for introducing fluidizing air into said passageway to selectively force solids therein into the combustion chamber.

9. A fluidized bed reactor comprising:
   a combustion chamber having a lower portion into which fuel is introduced, and an upper portion into which off-gases with entrained solids pass;
   means for effecting separation of solids from the off-gases in said upper part of said combustion chamber;
   a plurality of return conduits extending between said separating means and said lower part of said combustion chamber;
   at least one of said return conduits having heat transfer surface means associated therewith for positively cooling solids in contact therewith passing through said conduit; and
   means for controlling which of said conduits the solids flow through to return to said lower part of said combustion chamber, wherein each of said plurality of return conduits has heat transfer surface means therein for positively cooling soilds passing through the respective conduit.

10. Apparatus as recited in claim 9 wherein said means for controlling which conduits solids flow through comprises a valve means disposed adjacent the top of each conduit between said conduit and said separating means for controlling the entry of solids from said separating means to each of said conduits.

11. Apparatus as recited in claim 9 wherein each of said conduits is connected at the bottom end thereof through a passageway with a bend therein to said lower part of said combustion chamber, and wherein said means for controlling which conduits the solids flow through comprises means for introducing fluidizing air into said passageways associated with said conduits.

12. Apparatus as recited in claim 11 wherein said passageways are U-shaped.

13. Apparatus for controlling the temperature in a combustion chamber of a fluidized bed reactor which emits off-gases having particulate solids therein, to keep the temperature within a desired temperature range, comprising:
   (a) means for separating the solids from the off-gases;
   (b) means for controlling the temperature of the separated solids;
   (c) means for returning the temperature controlled solids to the combustion chamber, comprising a plurality of return conduits; and
   (d) means for controlling the means (b) and (c) so that the temperature, or temperature and mass, of the returned solids contribute to the heat content within the combustion chamber so as to maintain the temperature within the desired temperature range, said controlling means comprising means for controlling which conduits solids flow through, including separate valve means disposed within and adjacent the top of each conduit between said conduit and said separating means for controlling the entry of solids from said separating means to each of said conduits.

14. Apparatus for controlling the temperature in a combustion chamber of a fluidized bed reactor which emits off-gases having particulate solids therein, to keep the temperature within a desired temperature range, comprising:
   (a) means for separating the solids from the off-gases;
   (b) means for controlling the temperature of the separated solids;
   (c) means for returning the temperature controlled solids to the combustion chamber comprising a plurality of return conduits;
   (d) means for controlling the means (b) and (c) so that the temperature, or temperature and mass, of the returned solids contribute to the heat content within the combustion chamber so as to maintain the temperature within the desired temperature range;

each of said conduits being connected at the bottom end thereof through a passageway with a bend therein to said lower part of said combustion chamber; and means for controlling which conduits the solids flow through, including means for introducing fluidizing air into said passageways associated with said conduits.

15. Apparatus as recited in claim 14 wherein said passageways are U-shaped.

* * * * *